Aug. 5, 1958  M. KNOBEL  2,846,177
VACUUM FILLING AND WEIGHING MACHINE
Filed Oct. 4, 1955  6 Sheets-Sheet 1
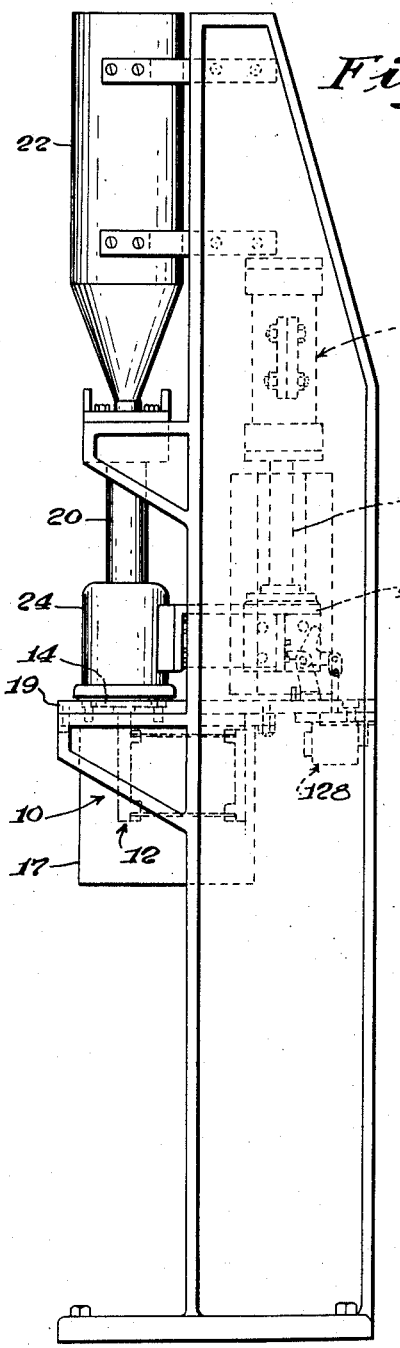
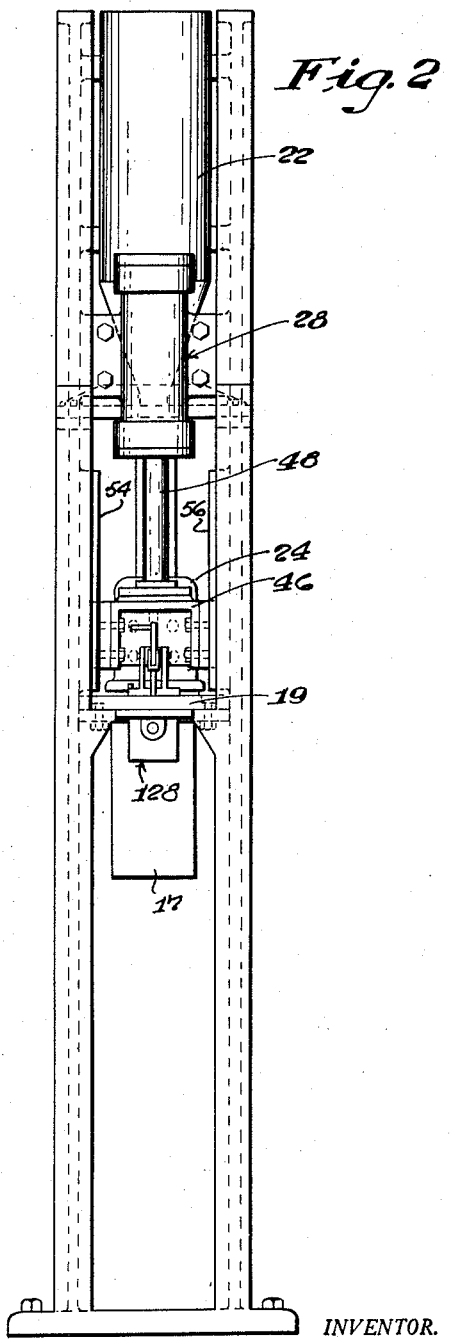
INVENTOR.
Max Knobel
BY
J. Stanley Churchill
ATTORNEY Aug. 5, 1958 M. KNOBEL 2,846,177
VACUUM FILLING AND WEIGHING MACHINE
Filed Oct. 4, 1955 6 Sheets-Sheet 2

INVENTOR.
Max Knobel
BY
J. Stanley Churchill
ATTORNEY

Aug. 5, 1958  M. KNOBEL  2,846,177
VACUUM FILLING AND WEIGHING MACHINE
Filed Oct. 4, 1955  6 Sheets-Sheet 3

Fig. 6

INVENTOR.
Max Knobel
BY
J. Stanley Churchill
ATTORNEY

Aug. 5, 1958          M. KNOBEL          2,846,177
VACUUM FILLING AND WEIGHING MACHINE
Filed Oct. 4, 1955          6 Sheets-Sheet 4
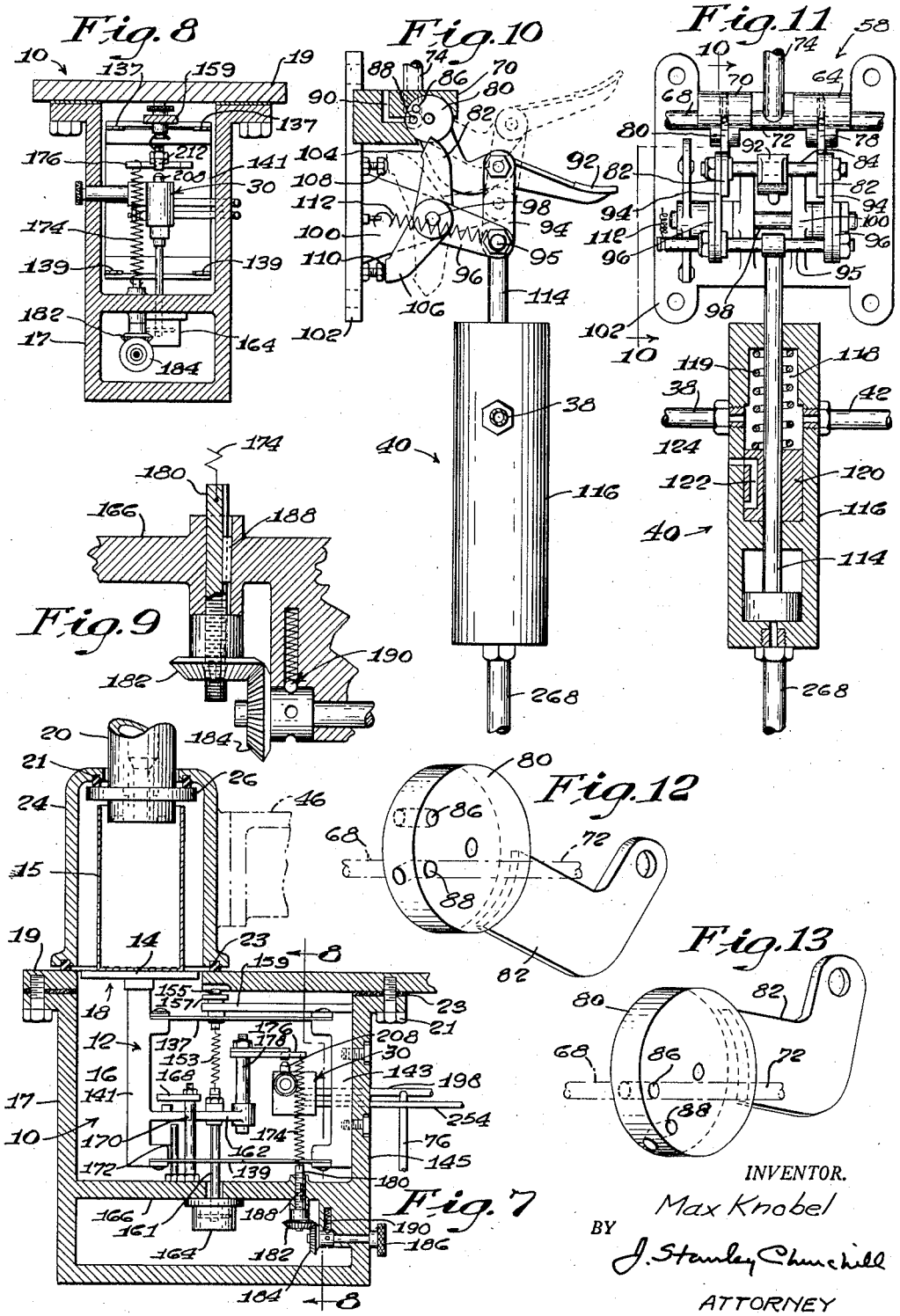
INVENTOR.
Max Knobel
BY
J. Stanley Churchill
ATTORNEY

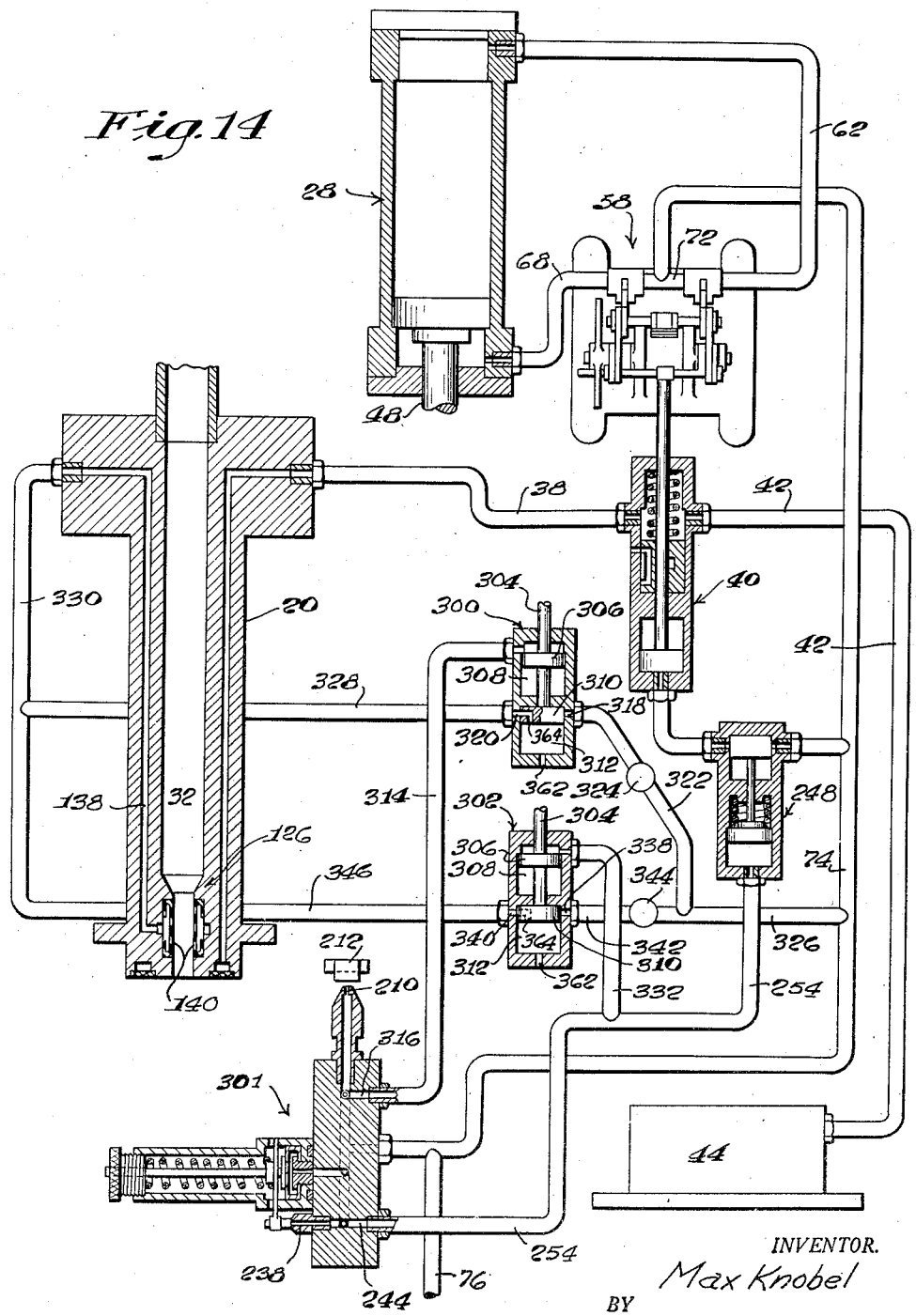

Aug. 5, 1958  M. KNOBEL  2,846,177
VACUUM FILLING AND WEIGHING MACHINE
Filed Oct. 4, 1955  6 Sheets-Sheet 6

INVENTOR.
Max Knobel
BY
J. Stanley Churchill
ATTORNEY

United States Patent Office 2,846,177
Patented Aug. 5, 1958

2,846,177

VACUUM FILLING AND WEIGHING MACHINE

Max Knobel, Boston, Mass., assignor to Pneumatic Scale Corporation, Limited, Quincy, Mass., a corporation of Massachusetts Application October 4, 1955, Serial No. 538,444

12 Claims. (Cl. 249—63)

This invention relates to a vacuum filling and weighing machine.

The invention has for an object to provide a novel and improved machine of the character specified wherein provision is made for weighing in a vacuum a load being formed in a container during the vacuum filling operation, and wherein provision is made for discontinuing the vacuum filling operation when a predetermined weight is reached whereby to form accurately weighed vacuum filled loads.

With this general object in view and such others as may hereinafter appear, the invention consists in the vacuum filling and weighing machine and in the various structures, arrangements and combinations of parts hereinafter described and particularly defined in the claims at the end of this specification.

In the drawings illustrating the preferred embodiment of the invention:

Fig. 1 is a vertical side elevation of the present vacuum filling and weighing machine;

Fig. 2 is a rear view of the same;

Fig. 6 is a diagrammatic view of the air lines shown operatively connected to the various pneumatically operated control elements, the latter being shown in vertical cross section;

Fig. 7 is a vertical cross sectional view in side elevation of the weighing mechanism;

Fig. 8 is a vertical cross section of the same as seen from the line 8—8 of Fig. 7;

Fig. 9 is an enlarged vertical cross sectional detail view of adjusting means for the weighing mechanism shown in Fig. 7;

Fig. 10 is a vertical side elevation of a valve mechanism for controlling the vacuum filling operation, one of the valves being shown in vertical cross section as seen from the line 10—10 of Fig. 11;

Fig. 11 is a front view of the same showing an associated control valve in cross section;

Figs. 12 and 13 are enlarged perspective views of a portion of the valve mechanism shown in Fig. 10 illustrated in different positions of operation;

Fig. 14 is a view similar to Fig. 6 illustrating a modified form of control mechanism;

In general the present invention contemplates a novel and improved vacuum filling and weighing machine for weighing a load of material deposited into a container during the vacuum filling operation wherein the weighing mechanism and the vacuum filling head are enclosed in an airtight chamber, and vacuum is applied to withdraw the air from the chamber to perform the filling operation, and wherein the weighing mechanism is provided with control means arranged to discontinue the vacuum filling operation and open the chamber to atmospheric pressure when a predetermined weight is reached whereby to form accurately weighed vacuum filled loads.

In the illustrated embodiment of the invention the container may be placed on the weighing platform in alignment with the filling head, and an elevated shroud is then moved into sealing engagement with the filling head and the weighing chamber whereupon vacuum is applied to withdraw the air from the chamber and to withdraw the material from a supply thereof to fall into the container without sealing engagement of the filling head with the mouth of the container, the material continuing to flow into the container until a predetermined weight is reached whereupon the vacuum is automatically discontinued and the shroud elevated in readiness for a succeeding weighing operation.

The feature of the invention wherein the container may be vacuum filled without sealing engagement of the filling head with the mouth of the container is of particular advantage in filling flexible containers, such as paper bags or other containers, wherein difficulty may be encountered in making an airtight seal with the mouth of the container, and wherein the body of the container may collapse when subjected to vacuum to withdraw the air preparatory to the filling operation. This feature is also of advantage in filling containers, such as flexible paper bags of more or less irregular and non-uniform shape, which could not be filled with uniform loads by prior methods of vacuum filling wherein variations in volume or filling height of the vacuum filled load may occur because of the irregularity in the shape of the containers.

In a modified form of the invention provision is made for modifying the stream of material being drawn into the container to provide a bulk stream until a predetermined bulk weight is reached, and for thereafter feeding a drip stream to complete the weighing operation.

Figure 3:
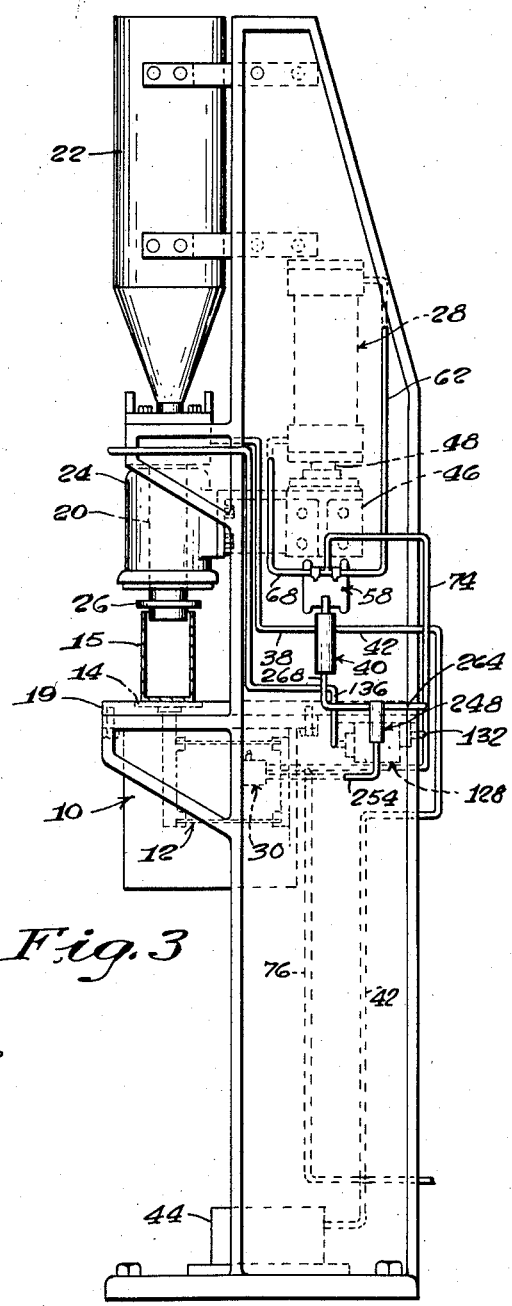
Fig. 3 is a vertical side elevation of the machine similar to Fig. 1 with some of the parts in a different position of operation and also showing the air lines operatively connected to the various pneumatically operated elements for controlling the operation of the machine.

Referring now to the drawings, in general the weighing mechanism, indicated generally at 10, may and preferably will comprise a cantilever spring weighing beam 12 having a platform 14 at its free end for supporting a container 15 to be filled. The weighing mechanism 10 may be supported in an airtight chamber 16 having an opening 18 in a platen 19 through which the platform 14 may extend. The container 15 is supported in alignment with a vacuum filling head 20 forming a part of the vacuum filling mechanism which may include a material supply hopper 22. Provision is made for sealing the vacuum filling head 20 in airtight relation to the weighing chamber 16, and as herein shown, a reciprocable shroud 24 shown in its elevated position in Fig. 3 is arranged to be lowered over the container to form an airtight seal against the upper surface of a collar 26 forming a part of the filling head and also against the upper surface of the platen 19 around the edge of the platform opening 18, thus sealing the shroud in airtight communication with the weighing chamber. As herein shown, the upper portion of the shroud 24 may be provided with an annular resilient sealing ring 21 for engagement with the collar 26, and the lower portion of the shroud may be provided with a similar ring 23 for engagement with the platen 19.

The shroud 24 is arranged to be reciprocated by pneumatically operated mechanism indicated generally at 28, and in general in the operation of the machine when the shroud is lowered into airtight relation to the filling head and the weighing chamber, suction is applied to evacuate the chamber and the shroud and to withdraw material from the supply hopper 22 through the vacuum filling head to flow into the container 15. Thereafter when a predetermined weight of material is deposited in the container, pneumatically operated control means associated with the weighing mechanism and indicated generally at 30 is arranged to discontinue the vacuum to cut off the supply of material and to automatically elevate the shroud whereupon the filled and weighed container may be removed from the platform and a new container placed thereon in readiness for a succeeding filling and weighing operation.

As illustrated in Fig. 1 and in detail in Fig. 6, the vacuum filling head 20 is provided with a central material inlet opening 32 through which the material flows into the container and which is connected at its upper end to the supply hopper 22. The lower end of the filling head 20 is provided with an annular screened suction opening 34 which communicates with a passageway 36 formed in the head and which is connected by a pipe 38 to a valve unit 40, as diagrammatically shown in Fig. 6. The valve unit 40 may be connected by a pipe 42 to any usual or preferred source of suction indicated generally at 44.

The valve unit 40 is arranged to control the vacuum to the filling head 20 in a manner such as to connect the vacuum lines to the filling head when the shroud 24 is lowered into operative engagement with the filling head and the weighing chamber by the pneumatically operated mechanism 28 and to cut off the vacuum to discontinue the flow of material into the container when a predetermined weight is reached. Operation of the valve unit 40 by the pneumatic control mechanism 30 to discontinue the vacuum is also arranged to effect reversal of the pneumatically operated reciprocating mechanism 28 to elevate the shroud 24. As herein shown, the shroud 24 is connected by a bracket 46 to the lower end of a piston rod 48 having a piston head 50 operating in a cylinder 52 which forms a part of the pneumatically operated mechanism 28 for reciprocating the shroud. The bracket 46 may be slidingly mounted between guides 54, 56 formed in the side frames as shown. The pneumatically operated reciprocating mechanism 28 is arranged to be controlled by a duplex valve unit 58, and as herein shown, the cylinder 52 is provided with an upper port 60 connected by a pipe 62 to one section 64 of the duplex valve and is also provided with a lower port 66 connected by a pipe 68 to the other section 70 of the duplex valve.

As shown in Fig. 6, the two sections of the duplex valve unit 58 are connected by an intermediate pipe 72 which in turn is connected by a pipe 74 and pipe 76 to any usual or preferred source of compressed air. As illustrated in detail in Figs 10 and 11, the duplex valve unit 58 includes two rotary valve members 78, 80 mounted to rock in the valve sections 64, 70 respectively, each valve member having an arm 82 connected by a tie rod 84 for simultaneous operation of the valves. Each valve member 78, 80 is provided with two ports, the ports in the member 80, shown in Fig. 10, comprising a through port 86 arranged to connect the intermediate pipe 72 with the pipe 68 leading to the lower port 66 of the cylinder 52 to effect elevation of the shroud, the second port 88 in the rotary valve member 80 being arranged to communicate with the atmosphere through an exhaust port 90 formed in the valve section 70. The other valve member 78 is also provided with ports 86, 88 except that they are oppositely arranged so that when the port 86 in valve 80 is aligned with pipes 68, 72 to effect elevation of the piston 50, the port 88 in valve 78 is aligned with its exhaust port 90 to permit the air to escape from above the piston. Conversely, when the port 86 in the valve 78 is aligned with the pipes 62, 72 to lower the piston, the port 88 in valve 80 is aligned with its exhaust port 90.

Thus, in operation when the duplex valve unit 58 is moved to one position of operation, such as the position shown in full lines in Fig. 10, the valve 78 will be connected to effect lowering of the shroud, and the other valve 80 will be open to the atmosphere, and conversely, when the valve unit is moved to the dotted line position in Fig. 10, the valve 80 will be connected to effect elevation of the shroud and the other valve 78 will be open to the atmosphere. As herein illustrated, the tie rod 84 may be provided with a handle 92 for convenience in rocking the valve arms 82 downwardly to effect descent of the shroud 24, the arms 82 being also connected by links 94 to a second cross pin 95 carried by rocker arms 96 pivotally mounted on a shaft 98 supported in extensions 100 of the base 102 of the duplex valve unit 58. Stop arms 104, 106 cooperating with adjacent stop screws 108, 110 are arranged to limit the rocking movement of the valves in both directions to align the port openings with their respective pipes, and a spring 112 connected between the base 102 and the cross pin 95 is arranged to hold the valve unit in its moved position on either side of the pivot 98.

The valve unit 40 which controls the vacuum to the weighing and filling chamber includes a spring-pressed plunger 114 mounted to reciprocate in a casing 116 having an upper chamber 118 in which a slide valve 120 carried by and movable with the plunger 114 is disposed. When the slide valve 120 is in its lowered position, as shown in Fig. 6, the vacuum pipe 42 is permitted to communicate with the pipe 38 to operatively connect the filling head 20 with the source of suction, and when the slide valve 120 is in its elevated position, the pipe 38 is arranged to communicate with a passageway 122 formed in the slide valve, the lower end of the passageway 122 being aligned with an exhaust port 124 formed in the casing 116 to open the filling and weighing chamber 16 to the atmosphere. As illustrated in Figs. 6 and 11, the plunger 114 of the valve unit 40 is connected to the cross pin 95 of the duplex valve 58. Thus, in operation when the handle 92 is manually depressed to operate the valve unit 58 to effect descent of the shroud 24 into operative engagement with the filling head and the weighing chamber, the slide valve 120 will be moved downwardly to the position shown in Fig. 6 to connect the filling and weighing chamber with the source of suction to evacuate the chamber and to start the vacuum filling operation.

As also shown in Fig. 6, the material inlet opening 32 of the filling head 20 may be of reduced diameter at its lower end and provided with an inflatable material cutoff unit, indicated generally at 126, and which is arranged to be controlled by a valve 128 having an inlet 130 connected by a pipe 132 to the compressed air pipe 74. The valve outlet 134 is connected by a pipe 136 to a passageway 138 formed in the filling head 20, the other end of the passageway communicating with an annular groove formed in the walls of the inlet 32 and in which the inflatable member, such as a rubber tube or ring 140, may be secured.

Figure 4:
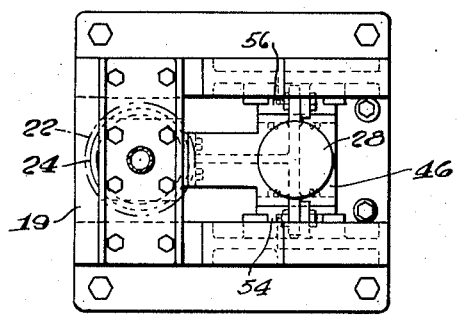
Fig. 4 is a plan view of the machine.
Figure 5:
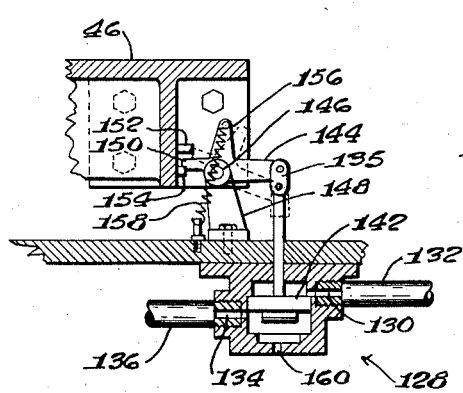
Fig. 5 is a detail view in vertical cross section of a control valve to be described.

Provision is made for operating the valve unit 128 to discontinue the flow of air to the member 140 when the shroud is lowered, and to permit the air to flow through the valve and effect inflation of the material cutoff member 140 when the shroud is elevated, whereby to prevent dripping of material from the filling head after the vacuum is discontinued. This may be accomplished by connections to the reciprocable shroud bracket 46, and as herein shown, see Figs. 1, 2 and 5, the valve piston 142 may be connected by a link 135 to one arm 144 of a three-armed lever pivotally mounted at 146 in a supporting bracket 148 attached to the machine frame. A second arm 150 of the lever is extended between two pins 152, 154 projected from a web of the bracket 46, and a third arm 156 is provided with a spring 158 arranged to retain the lever on either side of the pivot 146 to which the lever is moved. In operation when the shroud is lowered, the upper pin 152 will engage the arm 150 to rock the lever counterclockwise and effect movement of the piston 142 upwardly to the position shown in Fig. 5 which will uncover a port 160 in the lower wall of the valve unit to open the outlet 134 to the atmosphere and thus deflate the material cutoff member 140 and will also close off the air from the inlet 130. Conversely, when the shroud is elevated, the pin 154 will engage the arm 150 to rock the three-armed lever in a clockwise direction to close the atmospheric port 160 and permit communication between the inlet 130 and outlet 134 to effect inflation of the material cutoff member 140.

The weighing mechanism 12 comprising the cantilever weighing beam 14 cooperating with the pneumatically operated pressure responsive control unit 30 is arranged to automatically effect elevation of the spring-pressed plunger 114 in the valve unit 40 when a predetermined weight is reached whereby to discontinue the vacuum to the filling head 20, open the weighing chamber and shroud to the atmosphere, and simultaneously therewith, to operate the duplex valve unit 58 whereby to reverse the positions of the valves 78, 80 to effect elevation of the shroud. As shown in Fig. 7, the chamber 16, in which the weighing mechanism is supported, is formed within a casing 17 secured to the underside of the platen 19 by bolts 21, a sealing gasket 23 being interposed between the casing and the platen to assure an airtight seal.

As herein shown, the cantilever weighing beam 14 may comprise two upper and two lower relatively stiff cantilever leaf springs 137, 139 of equal length, the leaf springs being connected at their free ends to a rigid member 141 to which the platform 14 is attached, the other ends of the leaf springs 137, 139 being secured to a second rigid member 143 attached to a rear wall 145 of the casing 17. The weighing beam is also provided with a coil spring 153 arranged to exert a counterforce upon the spring beam, the spring 153 being connected at its upper end to a bolt 155 adjustably secured by nuts 157 in a bracket 159 attached to the fixed member 143 as shown in Fig. 7. The lower end of the coil spring 153 may be connected to a rod 161 fast in an arm 162 extending from and integral with the rigid member 141 of the spring beam. The rod 161 may extend below the arm 162 and may be provided with a piston operating in oil contained in a dash pot 164 attached to the underside of a web portion 166 formed in the casing 17. The cantilever spring beam 12 may be adjustably limited in its upward vertical movement by an upper stop plate 168 carried by an upstanding pin 170 attached to the web 166, the plate cooperating with a pin extended from the arm 162. The beam is limited in its downward movement by a lower stop screw 172 secured to the web 166 and engageable with the undersurface of the extended portion 162. A second coil spring 174 adapted for fine adjustment of the weighing unit, is connected at its upper end to an arm 176 extended from the upper end of a rod 178 supported in the arm 162, the lower end of the spring 174 being connected to a threaded spring stud 180 cooperating with a bevel gear nut 182 supported in a clearance opening in the base 166. The bevel gear nut 182 is arranged to mesh with a second bevel gear 184 which is arranged to be rotated by a handle 186 to effect manual adjustment of the coil spring 174 to increase or decrease the tension thereof. The threaded stud 180 may be provided with a key 188 slidable in the base opening to prevent rotation of the stud 180, and a spring-pressed ball and socket connection, indicated at 190, may be provided to hold the parts in their adjusted position.

In the illustrated embodiment of the invention provision is made for measuring the deflection of the spring beam 12 when depressed by the load being weighed to indicate the weight of the load. In practice the stiff cantilever springs 137, 139 are selected so that the weighing beam has a relatively small deflection value, and sensitive pneumatically operated control means, indicated at 30, is arranged to cooperate with the present spring beam for indicating or measuring the relatively small deflection of the spring beam when depressed by the load being weighed. The pneumatically operated unit 12 is constructed so that a large pressure change occurs upon deflection of the spring beam through a minute distance, and in general the deflection of the spring beam is arranged to increase the pressure in the pneumatically operated unit by an amount proportionate to the deflection.

As shown in Fig. 6, the pneumatcially operated measuring unit 30 includes a block 194 having a vertical passageway 196 connected to a regulated source of air under pressure by a pipe 198 and passageway 200, the upper end of the vertical passageway communicating with a horizontal chamber 202 through restricted throat portion 204 arranged to offer a substantial resistance to the flow of air therethrough. The chamber 202, which may be designated as the primary air chamber, in turn communicates with a vertical conduit 206 formed in a jet member 208 attached to the block 194, the member 208 having a small discharge orifice 210 arranged to cooperate with a valve member 212 carried by the weighing element to be movable therewith. Normally, the valve member 212 is spaced slightly from the orifice and the construction of the pneumatically operated unit is such that a large pressure change occurs upon minute movement of the valve member 212 toward the orifice 210 when the weighing element is deflected through a correspondingly minute distance. A second horizontal chamber 214, arranged at right angles to the conduit 206, is connected to an expansible bellows 216 supported in a chamber 218 formed in a laterally extended hollow member 220, attached to the block 194. The bellows 216 has a substantial area and is urged outwardly by the air pressure in the primary air chamber. A suitable resilient sealing ring 222 is provided in a recessed portion of the member 220 for engagement with the adjacent face of the block to provide a tight seal. The bellows 216 is arranged to cooperate with a piston rod 224 supported for horizontal reciprocation in the member 220 and having an enlarged head portion 226 engageable with the outer face or end of the bellows. The rod 224 may be provided with a depending arm 228 fast thereon, the arm extending through upper and lower slots 230 formed in the hollow member 220 for limiting the movement of the rod 224. A spring 232 coiled about the rod 224 and interposed between the arm 228 and an adjustable bearing member 234 supported in the outer end of the hollow member 220 is arranged to normally urge the rod 224 to the right, movement to the left being effected by an increase in pressure in the chamber 218 to inflate or expand the bellows 216 when the valve member 212 is moved toward the discharge orifice 210.

As herein illustrated, the lower end of the arm 228 extends through the member 220 and is provided with a valve 236 for cooperation with the orifice 238 of a second jet member 240 forming a part of and communicating with a secondary air chamber 242. The secondary chamber 242 communicates with the lower end of the vertical passageway 196 through a restricted throat portion 252, and the chamber 242 communicates with a through passageway 244 arranged at right angles to the chamber 242, one end of the passageway 244 communicating with the orifice 238 in the jet member 240, and the other end of the passageway 244 being connected by a pipe 254 to the lower chamber 246 of a hollow member 248 in which the piston 256 of a valve rod 249 is received. A spring 257 coiled about the rod 249 and interposed between the piston head 256 and a web 258 formed in the hollow member 248 is arranged to normally urge the rod and piston downwardly, and when the jet orifice 238 is closed, as illustrated, the pressure in the chamber 246 is sufficient to retain the piston and rod in its upwardly extended position, as shown. An upper chamber 260 of the hollow member 248 is provided with an inlet port 262 connected by a pipe 264 to the compressed air pipe 74, and an outlet port 266 of the chamber 260 is connected by a pipe 268 to a lower chamber 270 formed in the valve unit 40. The upper end of the rod 249 is provided with a valve member 272 operating in the upper chamber 260 and normally arranged, as shown, to cut off the air through the upper chamber 260. The lower end of the rod 114 in the valve unit 40 is provided with a piston head 274 operating in the lower chamber 270 and which is normally maintained in a lowered position, as shown, by the spring 119.

In operation the valve member 212 carried by the weighing element may be adjusted to normally provide a small space between the valve member 212 and the orifice 210 when the weighing element is in its elevated position, and upon minute deflection of the weighing element under the influence of the load, the valve 212 is moved toward the discharge orifice 210 a minute amount, thereby effecting a substantial pressure rise in the chamber 214 tending to expand the bellows 216 against the pressure of the coil spring 232. When the pressure in the primary air chamber acting on the bellows overcomes the spring the secondary valve 236 is thus moved to the left, viewing Fig. 6, to expose the opening 238 in the jet 240, thus reducing the pressure in the chamber 246 and permitting the spring 257 to move the piston rod 249 downwardly when a predetermined weight is reached. Thus, the ports 262, 266 are opened to permit compressed air to flow through the chamber 260 to increase the pressure in the chamber 270 and effect elevation of the rod 114 and valve member 120 to shut off the vacuum to the filling head terminating the filling operation, and opening the filling and weighing chamber to the atmosphere. Simultaneously therewith, the rod 114 effects shifting of the rotary valve members 78, 80 to cause pneumatically operated mechanism 28 to elevate the shroud 24, whereupon the filled container may be removed and a new container placed in operative position on the platform 14 in readiness for a succeeding vacuum filling and weighing operation. It will also be observed that the valve unit 128 actuated by the reciprocation of the shroud bracket 46 serves to effect opening of the material inlet 32 when the shroud is lowered and to effect closing of the inlet when the shroud is elevated.

Referring now to Figs. 14 to 17 inclusive, in a modified form of the invention provision is made for controlling the flow of material through the supply inlet 32 in a manner such as to feed a relatively large or bulk stream of material into the container until a predetermined bulk weight is reached, and for thereafter feeding a reduced or drip stream to the container until a final predetermined weight is reached whereupon the inlet 32 is completely closed. The modified form of vacuum filling and weighing machine may take substantially the same general form as the machine shown in Figs. 1 to 13 except that the material inlet control valve 128 is eliminated and in its place a pair of valve units, indicated generally at 300 and 302, are provided. One of the valve units 300 is designed to be actuated to effect partial inflation of the feed cutoff member 140 when a predetermined bulk weight is reached, thus reducing the size of the material inlet to feed a smaller stream, the other valve unit 302 being operative at a higher pressure when a final weight is reached to completely inflate the feed cutoff member 140 to entirely cut off the feed of material.

Each valve unit 300, 302 may be similar in construction and mode of operation, each being provided with a valve stem 304 having a piston 306 operating in an upper chamber 308, the stem 304 being also provided with a valve member 310 operating a lower chamber 312. As seen in Fig. 14, the upper chamber of the valve unit 300 is connected by a pipe 314 to a pressure chamber 316 of the pneumatically operated unit 301. The pneumatically operated unit 301 may be similar in construction and mode of operation to the unit 30 previously described except for the additional pressure chamber connection 316. The lower chamber of the valve unit 300 is provided with an inlet 318 and an outlet 320, the inlet 318 being connected by a pipe 322, having a pressure regulating valve 324, to a pipe 326 which is connected to the main compressed air pipe 74. The outlet 320 may be connected by a pipe 328 to a pipe 330 which in turn is connected to the passageway 138 leading to the inflatable member 140.

The upper chamber of the second valve unit 302 is connected by a pipe 332 and the pipe 254 to a similar pressure chamber 244 of the pneumatically operated unit 301, the lower chamber of the unit 302 being provided with an inlet 338 and outlet 340. The inlet 338 is connected by a pipe 342, having a pressure regulating valve 344, to the compressed air pipe 326. The outlet 340 may be connected by a pipe 346 to the pipe 330 leading to the passageway 138.

Figure 17:
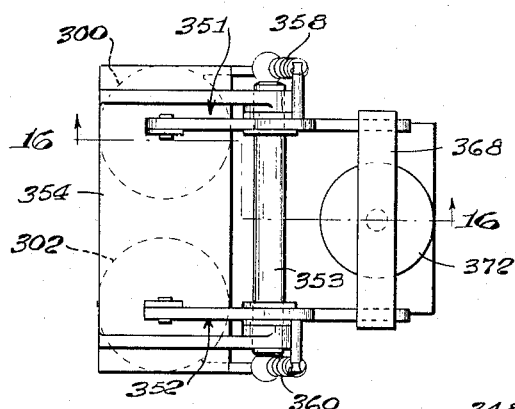
Fig. 17 is a plan view of the same.
Figure 16:
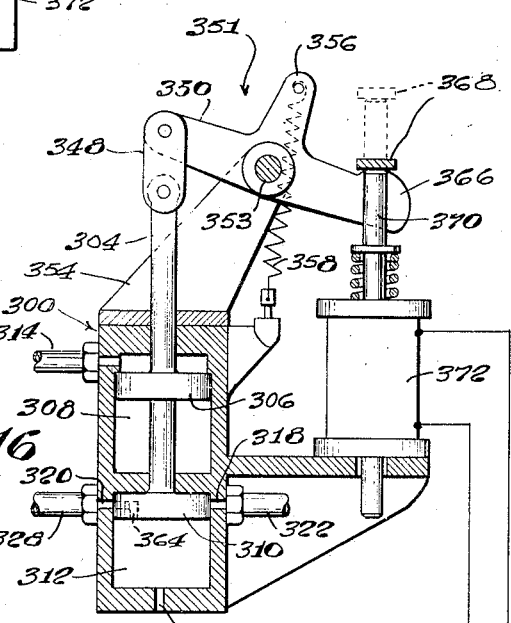
Fig. 16 is a vertical cross sectional view taken on the line 16—16 of Fig. 17 of a solenoid operated control valve forming a part of the modified control mechanism.

As shown in Figs. 16 and 17, each valve stem 304 is connected by a link 348 to an arm 350 of individual three-armed levers 351, 352 pivotally mounted on a shaft 353 supported in a bracket 354, a second arm 356 of each lever being provided with springs 358, 360 respectively arranged to maintain the lever on either side of the pivot shaft 353 to which it is rocked. In practice one spring 360 may be of greater tension than the spring 358 so that one increase in pressure when a bulk load is reached will operate the valve unit 300, and a greater increase in pressure when a final weight is reached will operate the valve unit 302, as will be described.

As shown in Fig. 16, the lower chamber 312 of each valve unit 300, 302 is provided with a vent opening 362, and each valve member 310 is provided with a passageway 364 arranged to be aligned with its respective outlet port 320, 340 and in communication with its vent chamber 312 when the valve member 310 is in its upper position, as illustrated, to effect deflation of the inflatable member 140. In operation when the valve member 310 is moved downwardly by an increase in pressure in the upper chamber 308, communication is established between the inlet and outlet ports of the lower chamber to effect inflation of the member 140.

Figure 15:
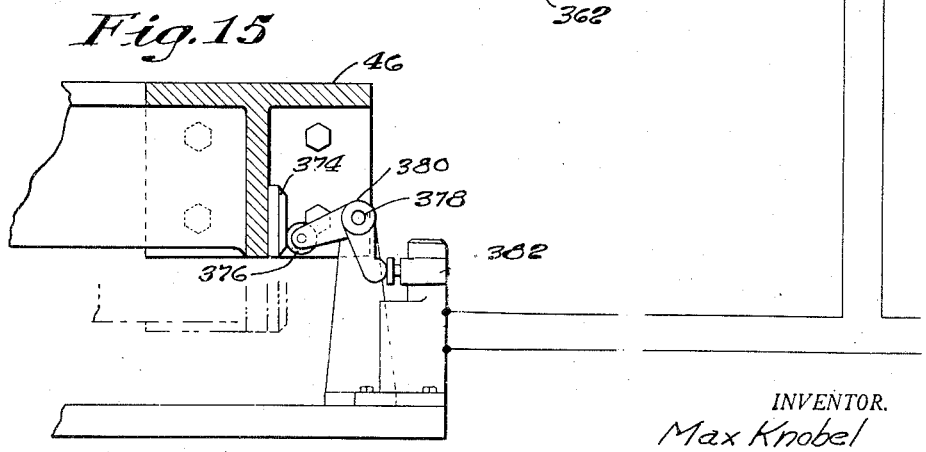
Fig. 15 is a detail view of a control switch forming a part of the control mechanism shown in Fig. 14.

Provision is made for automatically resetting both valve stems 304 to their upper position, as shown, when the shroud is lowered into operative vacuum filling and weighing position, and for this purpose a third arm 366 of each lever 351, 352 is arranged to cooperate with a transverse resetting bar 368 carried by the armature 370 of a solenoid 372. As shown in Fig. 15, in the modified form of the invention the shroud bracket 46 may be provided with a cam piece 374 arranged to cooperate with a roller 376 carried by one arm of a bell crank 378 pivotally mounted at 380. The second arm of the bell crank 378 is arranged to cooperate with a switch 382 in circuit with the solenoid 372.

In the operation of the modified form of the invention when the shroud approaches its lowered position, the cam piece 374 will engage the roller 376 to close the switch 382, further lowering of the shroud into its fully lowered position, as indicated by the dotted line position of the bracket 46 in Fig. 15, bringing the cam piece 374 below the roller 376 so that the switch 382 may be spring returned to its open position. Thus, the solenoid 372 is energized to pull the resetting bar 368 downwardly, as shown, to rock both levers 351, 352 in a clockwise direction, the levers remaining in their reset position by virtue of the springs 358, 360, and the resetting bar 368 returning to its initial up position, as shown in dotted lines in Fig. 16, when the solenoid is deenergized by movement of the shroud to its fully lowered position. In this position of the valve units 300, 301 both air lines 328, 346 leading to the inflatable member 140 will be open to the atmosphere, and the material inlet will be wide open to feed a bulk stream of material into the container. Thereafter, when a predetermined bulk weight is reached, the valve 212 will be moved toward the orifice 210 a distance such as to increase the pressure in the chamber 316 sufficiently to overcome the spring 358 of the valve unit 300 and move the stem 304 downwardly to establish communication between the air lines 322, 328 and effect partial inflation of the member 140, the pressure being controlled by the regulator 324. Then when a final weight is reached, the increase in pressure in the chamber 244 immediately prior to opening of the orifice to effect a reduction in pressure will overcome the stronger spring 360 of the second valve unit 302 and operate the unit to establish communication between the pipes 342, 346 to effect further inflation of the member 140 as controlled by the regulator 344 to entirely cut off the material feeding inlet. Substantially immediately thereafter, the pneumatically operated unit 301 will be actuated to effect tripping of control valve 248, cut off the vacuum and operate the duplex valve unit 58 to effect elevation of the shroud. During the upward movement of the shroud the cam piece 374 may rock the bell crank 378 clockwise without effecting actuation of the switch 382, the bell crank returning to its normal position after the cam piece passes beyond the bell crank. Thus, the material inlet will remain closed until the shroud is again lowered by manual operation of the duplex valve 56 whereupon the valve units 300, 302 are reset by the solenoid 372 to start another cycle of operation.

From the above description it will be seen that the present structure of vacuum filling and weighing machine wherein the weighing mechanism is entirely enclosed in a vacuum chamber with the filling head is capable of producing accurately weighed vacuum filled loads. It will also be observed that the present machine is capable of handling and vacuum filling either rigid containers, such as bottles or cans, or flexible containers, such as paper bags, without direct or sealing engagement of the filling head with the mouth of the container, and as a result, the present machine is enabled to provide uniform weights or amounts of material in successive containers irrespective of the contour or volume thereof.

While the preferred embodiment of the invention has been herein illustrated and described, it will be understood that the invention may be embodied in other forms within the scope of the following claims.

Having thus described the invention, what is claimed is:

1. In a machine of the character described, in combination, weighing mechanism, vacuum filling means operatively connected to a supply of material, means enclosing the weighing mechanism and the vacuum filling means in an airtight chamber, said vacuum filling means including means for evacuating the chamber and withdrawing the material from the supply to be received by said weighing mechanism, and control means associated with and responsive to the operation of the weighing mechanism for discontinuing the vacuum filling operation and for opening the chamber to the atmosphere when a predetermined weight is reached.

2. A machine as defined in claim 1 wherein the weighing mechanism is provided with means for supporting a container, and the vacuum filling means is disposed in alignment with and in non-sealing relation to the mouth of the container.

3. In a machine of the character described, in combination, weighing mechanism having means for supporting a container, vacuum filling means having a filling head operatively connected to a supply of material, a vacuum chamber enclosing the weighing mechanism, container and filling head, said vacuum filling means including: means for evacuating the chamber; means for withdrawing material from the supply; and means for depositing the material into the container, and control means associated with and responsive to the operation of the weighing mechanism for discontinuing the vacuum filling operation and opening the chamber to the atmosphere when a predetermined weight is reached.

4. A machine as defined in claim 3 wherein the filling head is disposed above and in non-sealing relation to the mouth of the container.

5. In a machine of the character described, in combination, an airtight chamber having an opening in its upper wall, weighing mechanism supported in said chamber and having a platform aligned with said opening for supporting a container, vacuum filling means having a filling head provided with a material inlet operatively connected to a supply of the material and disposed above and in non-sealing relation to the mouth of said container, a reciprocable shroud adapted to be lowered over the container into sealing engagement with said filling head and said opening and in communication with said chamber, said vacuum filling means including means for evacuating the shroud and the chamber to effect withdrawal of material from the supply to fall into the container, and control means associated with and responsive to the operation of said weighing mechanism for: discontinuing the vacuum filling operation; opening the shroud and chamber to the atmosphere; and elevating the shroud when a predetermined weight is reached.

6. A machine as defined in claim 5 having means for opening and closing said material inlet, and control means actuated by the reciprocation of said shroud for opening the inlet when the shroud is lowered, and for closing the inlet when the shroud is elevated.

7. A machine as defined in claim 5 having means for opening and closing said material inlet, and control means associated with and responsive to the operation of said weighing machine for effecting partial closing of said inlet to reduce the flow of material into the container when a predetermined primary weight is reached, and for entirely closing said inlet when a predetermined final weight is reached.

8. A machine as defined in claim 7 having means actuated by the elevation of the shroud for resetting said inlet control means.

9. In a vacuum filling and weighing machine, in combination, a hollow casing forming an airtight chamber having an opening in its upper wall, weighing mechanism including a cantilever weighing beam supported in said chamber and having a platform aligned with said opening for supporting a container, vacuum filling means having a filling head provided with a material inlet operatively connected to a supply of the material and disposed above and in non-sealing relation to the mouth of the container, a reciprocable shroud adapted to be lowered over the container into sealing engagement with said filling head and said opening, the interior of the shroud communicating with the interior of the chamber, said vacuum filling means including means for evacuating the shroud and the chamber to effect withdrawal of material from the supply to fall into the container, and pneumatically operated control means associated with and responsive to deflection of said cantilever beam when a predetermined weight is reached for: discontinuing the vacuum filling operation; opening the shroud and chamber to the atmosphere; and elevating the shroud when a predetermined weight is reached.

10. In a vacuum filling and weighing machine, in combination, weighing mechanism having means for supporting a container, vacuum filling means operatively connected to a supply of the material, means enclosing the weighing mechanism and the vacuum filling means in an airtight chamber including a reciprocable shroud, said vacuum filling means including means for evacuating the chamber and withdrawing the material from the supply to fall into said container, and control means associated with and responsive to the operation of the weighing mechanism for discontinuing the vacuum filling operation, opening the chamber to the atmosphere, and removing said shroud when a predetermined weight is reached.

11. In a vacuum filling and weighing machine, in combination, weighing mechanism, vacuum filling means having a filling head provided with a material inlet and operatively connected to a supply of the material, means enclosing the weighing mechanism and the vacuum filling head in an airtight chamber, said vacuum filling means including means for evacuating the chamber and withdrawing the material from the supply to be received by the weighing mechanism, and control means associated with and responsive to the operation of said weighing mechanism for discontinuing the vacuum filling operation, opening the chamber to the atmosphere, and closing said material inlet when a predetermined weight is reached.

12. In a vacuum filling and weighing machine, in combination, weighing mechanism, vacuum filling means having a filling head provided with a material inlet and operatively connected to a supply of the material, means enclosing the weighing mechanism and the vacuum filling head in an airtight chamber, said vacuum filling means including means for evacuating the chamber and withdrawing the material from the supply to be received by the weighing mechanism, and control means associated with and responsive to the operation of the weighing mechanism for partially closing said material inlet to reduce the flow of material when a predetermined primary weight is reached, and for entirely closing said inlet when a predetermined final weight is reached.

References Cited in the file of this patent

UNITED STATES PATENTS

| | | |
|---|---|---|
| 2,138,356 | Ryan et al. | Nov. 29, 1938 |
| 2,232,437 | Bushman | Feb. 18, 1941 |
| 2,605,075 | Brown | July 29, 1952 |

FOREIGN PATENTS

| | | |
|---|---|---|
| 487,538 | Canada | Oct. 28, 1952 |